Aug. 12, 1952  M. F. BATES  2,606,622
HELICOPTER CONTROL APPARATUS
Filed Dec. 31, 1947  2 SHEETS—SHEET 2

INVENTOR
MORTIMER F. BATES
BY
HIS ATTORNEY

Patented Aug. 12, 1952

2,606,622

UNITED STATES PATENT OFFICE 2,606,622

HELICOPTER CONTROL APPARATUS

Mortimer F. Bates, Brooklyn, N. Y., assignor to The Sperry Corporation, Great Neck, N. Y., a corporation of Delaware Application December 31, 1947, Serial No. 794,844

2 Claims. (Cl. 170—160.25)

This invention relates to helicopter rotor pitch control apparatus and, more particularly, concerns means for preventing a stall condition in the receding rotor blade, when the collective pitch of the rotor blades is at a maximum, and it becomes desirable to alter cyclical pitch.

Heretofore, with maximum lift set into the rotor blade by the collective pitch control, it has been impossible to increase or change the cyclical pitch of the blades alone, to thereby enter the craft into forward flight without causing the receding blade to exceed its maximum optimum angle of attack. In other words, during a hovering condition, with maximum lift set in the rotor blades, it was not possible to decrease the pitch of the advancing blade cyclically without increasing the pitch of the receding blade thereby producing a stalled condition, unless the pilot consciously reduces the collective pitch simultaneously in this maneuver.

The mechanism of the instant invention overcomes this limitation by providing means for coordinating cyclical pitch with collective pitch, whereby a collective pitch change is made simultaneously with each cyclical pitch change without other action on the pilot's part. Further, the collective pitch change is coordinated with the cyclical pitch change to thereby produce the net result of decreasing the pitch of the advancing blade alone. The instant invention also resides in the provision of a mechanism whereby the swash plate, which controls the pitch of the blades, is made to tilt at its edge (in effect) at the desired azimuth point, in preference to the present method of control whereby the swash plate is tilted about a centrally located pivot point. In achieving the desired result, a mechanism is provided whereby each and every change in cyclical pitch is accompanied by a corresponding but smaller change in collective pitch, which changes, together, have the effect of tilting the swash plate about an edge, this edgewise tilt is in contrast to the only method presently known to the art of tilting the swash plate about a central pivot point.

It is a primary object of the invention to provide a system whereby changes may be made in the pitch of the advancing blade without effecting the pitch of the receding blade.

A further object is to provide a control system for helicopters for coordinating the collective pitch control with the cyclical pitch control by way of a differential connection.

Another object is to provide a control system for helicopter rotor blades that will eliminate the normal interference usually present in their limiting, or extreme position of operation, between cyclical and collective pitch control means.

A still further object is to provide vibration free pitch control of helicopter rotor blades thereby avoiding blade pitch stall condition of the receding blade, in forward flight.

Other objects and advantages will become apparent from the specification, taken in connection with the accompanying drawings wherein one embodiment of the invention is illustrated.

Figure 1:
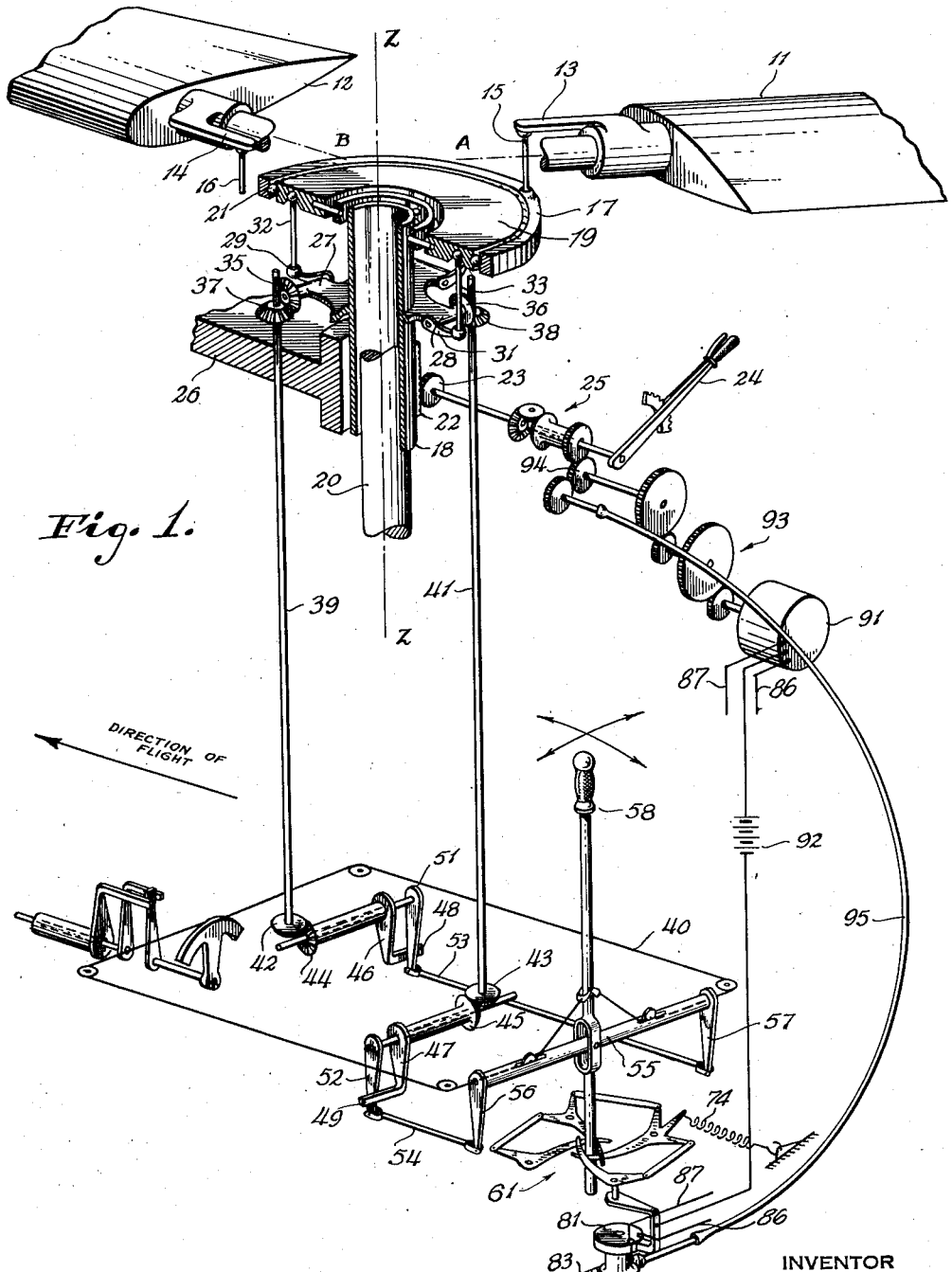
Fig. 1 illustrates the instant invention as applied to a helicopter control mechanism including a cyclical and collective pitch control means.

Referring now to Fig. 1, the rotor blades 11 and 12 are illustrated as being pivotable about the axes A and B respectively. While mounting means for the rotor blades are not illustrated, details of a complete system including the rotor mounting may be obtained from my copending application Serial No. 698,199 filed September 20, 1946. In the present embodiment, the pitch control arms 13 and 14, which serve to pivot the rotor blades 11 and 12 about their respective axes, are secured to the connecting links 15 and 16, which in turn rotate with the rotating element 17 of the swash plate. The rotating element 17 may be rotated by an engine about Z—Z, the vertical axis of the rotor. Rotating ring 17 is shown in an athwartship section and is mounted to be rotatable about the stationary element 19 of the swash plate, the bearings 21, serving to interconnect these two elements. The stationary element 19 is mounted to be universally tiltable about the sleeve 18 but is not rotatable with the element 17. Driving shaft 20 is driven by the engine (not shown) and may be connected in a manner as set forth in the above-identified copending application, to cause the element 17 to rotate, and also impart rotation to the rotor blades 11 and 12. An operating gear rack member 22 extending downwardly from the sleeve 18 secured thereto will raise or lower the sleeve 18 upon rotation of the driving gear 23 which rotates in response to motion of the collective pitch control arm 24 operative through the differential 25. Thusly, as the collective pitch control arm 24 is raised or lowered, the driving gear 23 will move the rack 22 upwardly or downwardly taking with it the sleeve or hollow shaft 18, thereby uniformly raising or lowering the elements 17 and 19 relative to the structure of the craft, a section of which is shown at 26. Also secured to the sleeve 18 are several brackets, two of which are illustrated at 27 and 28. These brackets support offset lever arms 29, 31 respectively, which lever arms, upon being displaced, cause tie rods 32 or 33 to correspondingly displace the elements 17 and 19.

Under normal operating conditions, the offset arms 29 and 31 would be displaced differentially, or in other words, one would move upwardly and the other one an equal amount downwardly, to thereby impart cyclical pitch control motion to the rotor blades 11 and 12. However, in the instant embodiment, the lever arms 29 and 31 are secured to the bevel gears 35 and 36, mating with the bevel gears 37 and 38, the latter pair of gears being mounted on shafts 39 and 41 respectively. The shafts 39 and 41 are provided with slot and key arrangements, whereby the bevel gears 37 and 38 may ride up and down along the shafts whenever motion of the collective pitch control means raises the sleeve 18 with respect to the fuselage 26. The lower ends of shafts 39 and 41 are provided with bevel gears 42 and 43 arranged to mate with corresponding gear sections 44, 45 mounted to rotate with the arms 46, 47. The arms 46 and 47 in turn are provided with right angle projections 48, 49, so arranged that, in conjunction with motion of the levers 51 and 52 respectively, only one lever, say 51, will be in contact with one projection 48 upon motion of the tie rod 53 in a direction to the left, as illustrated in the drawing. Motion of the tie rod 54 to the left in the drawing will not serve to displace the projection 49. Motion of the tie rod 54 to the right (in the drawing) will displace the projection 49 whereas the projection 48 will not be affected by motion of the tie rod 53 to the right, as shown in the drawing. By means of the pivotal mounting of the tube 55 having the arms 56 and 57 in an offset relation thereto (the arms 56 and 57 being secured to the tie rods 54 and 53), motion of the control stick 58 forward or backward will cause the arms 56 and 57 to displace the tie rods 53 and 54 in a direction dependent upon that control stick motion. Thusly, as control stick 58, for example, is moved forwardly, the arms 56 and 57 will move backwardly, the projection 49 will be activated by the linkage as above described, thereby causing the shaft 41 to rotate. Upon the rotation of shaft 41 the bevel gears 38 and 36 will correspondingly rotate, causing the tie rod 33 to tilt the elements 17 and 19, in proportion to the original motion imparted to the control stick 58.

When the element 19 tilts in response to the motion imparted as above described, the tie rod 32 will be oppositely displaced and this motion will be transmitted through the gears 35 and 37 to the shaft 39 down the system until the projection 48 moves into contact with the activating arm 51 which in the meantime has assumed a new position.

Figure 5:
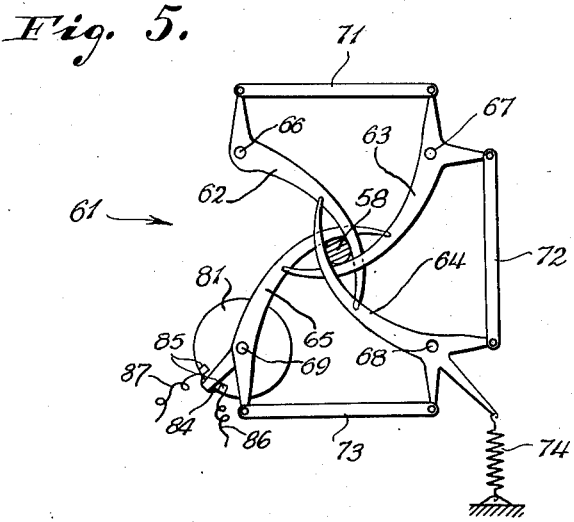
Fig. 5 illustrates in detail the mechanism whereby the collective pitch control means is made responsive to changes in the cyclical pitch control means.

From the description thus far provided it can be seen that by motion of the control stick 58 forward or aft, the elements 17 and 19 will be tilted about a pivotal point on the Z—Z axis. However, it is desired that for every change in cyclical pitch, a corresponding and proportional change in collective pitch be transmitted to the elements 17 and 19. To this end, a mechanism comprising a system resembling an iris diaphragm is employed. This mechanism, generally identified 61, is more particularly illustrated in Fig. 5. In Fig. 5, control stick 58 is illustrated in cross section as being surrounded by four fingers 62, 63, 64, 65, each having an arcuate configuration and each pivotally mounted about the pivot points 66, 67, 68 and 69. The connecting links 71, 72 and 73 insure that when any one of the fingers is displaced from the position illustrated (which displacement would be caused by motion of the control stick 58 from the neutral position illustrated) the other three will be displaced an equal and corresponding amount. The spring 74 serves to tie all four of the fingers into a resilient formation about the control stick 58. Thusly to reiterate the operation of this iris arrangement, upon displacement of the control stick 58 in any direction, each of the fingers surrounding the control stick are displaced or pivoted about the respective pivot points in an amount dependent upon the tilt of the control stick 58 from an upright position. Pivoted to be rotatable on an axis with that defined by the pivot point 69 is a commutator switch section 81 having on the bottom part thereof a geared section 82 which is arranged to mate with a worm gear 83. The switch 81 is provided with two insulated contact areas 85—85 on the periphery thereof. Upon displacement of any of the fingers above described, the finger 65 moves about its pivot point 69 and an insulated contact arm 84 secured to the finger 65 comes into contact with one of the contact areas 85—85 thereby completing an electrical circuit therethrough. Upon completion of this electrical circuit the reversible servomotor 91 is energized through the voltage source 92 and upon rotation of the servomotor 91 the gearing sequence identified generally at 93 is activated to cause the other half of the differential 25 to impart a collective pitch motion to the elements 17 and 19. A feedback mechanism comprising the gears 94 and the flexible shaft 95, terminating in the worm screw 83 previously described, serves to reposition the commutator switch 81 to a neutral position after the servomotor 91 has imparted the proper amount of displacement in collective pitch to the elements 17 and 19. When the control stick 58 is restored to a neutral position, the fingers 62, 63, 64 and 65 close on the extension of the control stick 58 and the motor 91 is energized in an opposite direction to raise the collective pitch to the position it maintained prior to its original displacement. In other words, upon motion of the control stick 58 forward, the contact arm 84 would come in contact with one segment 85 thereby completing a circuit to the motor 91 through line 87 and energizing the motor for rotation in one direction. On return of the control stick 58 to its neutral position, the commutator switch 81 having been displaced from its original position by the follow-up cable 95, the contact arm 84 will now come in contact with the other segment 85 and accordingly line 86 will serve to complete a circuit through it, and the motor 91 will then turn in the opposite direction until the collective pitch control means returns to its original position. Thusly, by coordinating the amount that the servomotor causes the elements 17 and 19 to rise or fall in a collective motion, a collective pitch motion corresponding to a cyclical pitch motion has been provided. In other words, whenever a cyclical pitch adjustment is imparted to the rotating element 17, a corresponding collective pitch adjustment is also imparted thereto. By selection of a proper ratio of the gears 93, for a cyclical displacement of one unit, the collective pitch displacement may be made equal to one half a unit, or any other desired fraction thereof.

Figure 2:
Figs. 2, 3 and 4 illustrate several conditions of rotor blade pitch together with swash plate positions.
Figure 3:
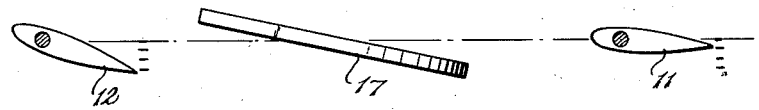
Figure 4:

In Fig. 2, 3 and 4, three sequences of the above described operation are illustrated. The first of these three figures shows the element 17 as being in a neutral position and two rotor blades 11 and 12, are shown in cross section, one being the advancing blade and the other being the receding blade. In normal operation, and without collective pitch coordination, upon the occurrence of a cyclical pitch change, such as would result from displacement of the control stick 58, the element 17 is, in effect, tilted about its mid-point as shown in Fig. 3. Thereupon, the pitch of the advancing rotor blade 11 is decreased and the pitch of the receding blade 12 is increased in corresponding amounts. It is this condition that is sought to be avoided by the instant invention, for, during the condition when the rotor blades are operating at the maximum collective pitch, the change of pitch of both the receding and advancing blades will cause the receding blade to exceed the maximum optimum pitch and thereupon it would enter into a stalled condition.

Thusly, to avoid this effect the apparatus above-described illustrates a mechanism that, in response to every cyclical pitch change, a corresponding and proportional collective pitch is entered into the system. Thusly, in Fig. 4, the element 17 is illustrated as having been uniformly displaced from the neutral position in addition to having been tiltably displaced as above described. This combined displacement serves to impart to the advancing rotor blade 11 a greater pitch component whereas the pitch of the receding rotor blade 12 has not been altered.

While the mechanism herein described illustrates control about a single axis, control about both axes (that is fore and aft or athwartship) may be realized by the arrangement illustrated in part. In response to motion of the control stick 58 in an athwartship direction, the rigging 40 may be made to cause similar action on athwartship position control rods for the swash plate 17. Furthermore, the mechanisms herein illustrated may be replaced by those skilled in the art, with electrical counterparts without departing from the concepts of the instant invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A helicopter with variable pitch rotor blades having means for effecting cyclical changes in the pitch of the rotor blades, means for effecting collective changes in the pitch of the rotor blades, a differential having an output connected to and operating said collective pitch changing means and two inputs, manually operable means connected to one of the inputs of said differential, and manually operable means connected to said cyclical pitch changing means and to the other input of said differential.

2. A helicopter with variable pitch rotor blades having means for effecting cyclical changes in the pitch of the rotor blades, means for effecting collective changes in the pitch of the rotor blades, a differential having an output connected to and operating said collective pitch changing means and two inputs, manually operable means connected to one of the inputs of said differential, a servomotor connected to and operating the other of the inputs of said differential, a two part pick-off providing a signal for operating said servomotor, manually operable means connected to said cyclical pitch changing means and one of the parts of said pick-off, and follow back means responsive to said servomotor operatively connected to the other of the parts of said pick-off.

MORTIMER F. BATES.

REFERENCES CITED

The following references are of record in the file of this patent:

UNITED STATES PATENTS

| Number | Name | Date |
| --- | --- | --- |
| 1,912,354 | Pescara | May 30, 1933 |
| 2,380,582 | Cierva | July 31, 1945 |
| 2,418,030 | Hirsch | Mar. 25, 1947 |
| 2,427,646 | Synnestvedt | Sept. 16, 1947 |
| 2,499,161 | Pitcairn | Feb. 28, 1950 |